Feb. 15, 1938.                A. A. MARKS                2,108,591
                          LICENSE PLATE HOLDER
                          Filed May 22, 1935
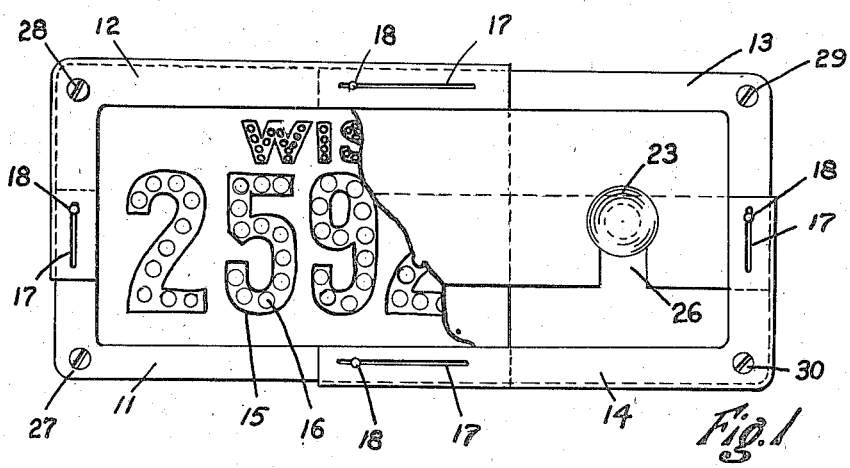
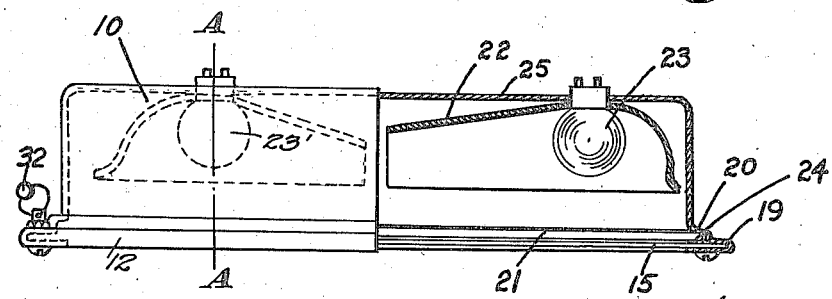
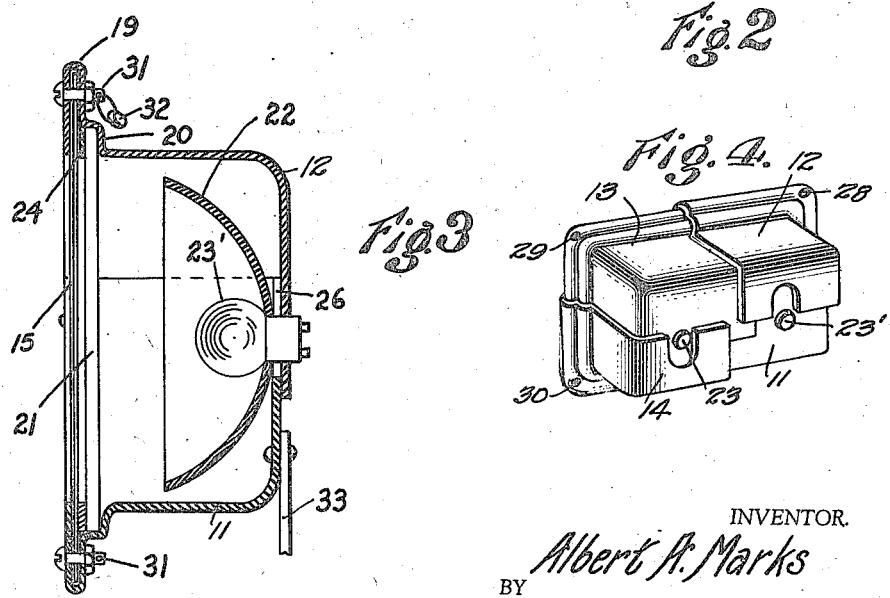
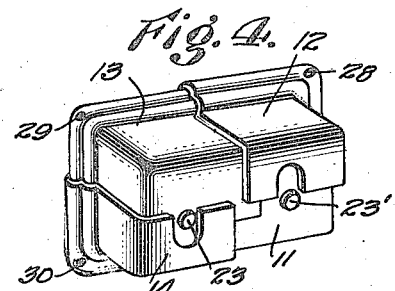
INVENTOR.
Albert A. Marks
BY
John L. Baird
ATTORNEY.

Patented Feb. 15, 1938

2,108,591

UNITED STATES PATENT OFFICE 2,108,591

LICENSE PLATE HOLDER

Albert A. Marks, West Allis, Wis.

Application May 22, 1935, Serial No. 22,906

1 Claim. (Cl. 40—133)

My invention relates to license plate holders and more particularly to a type of license plate holder that has a lamp and reflector encased therein behind a perforated plate to illuminate said plate in the dark.

An object of my invention is to provide an adjustable holder to support the perforated license plate. The adjustable feature makes it possible to extend the holder horizontally and vertically to fit any standard size of license plate.

Another object of my invention is to provide a device as described that will permit the use of electric lights and reflectors behind the plate.

Another object of my invention is to provide a license plate holder that will permit sealing the plate into position within the container thereby preventing its removal without breaking the seal.

The invention is fully described in the following specification of which the accompanying drawing is a part and in which the separate parts of my invention are designated by suitable reference characters in each of the views, and in which Fig. 1 shows a fragmentary view of the face of the license plate and container.

Fig. 2 shows a fragmentary cross sectional top view of the device,

Fig. 3 is a cross sectional view of the device taken at line AA of Fig. 2, and

Fig. 4 is a perspective view of the back of the device showing the manner of its construction.

Referring now to the drawing in which like characters of reference denote corresponding parts in all of the several views, the character 10 illustrates the holder consisting of four angularly disposed transverse sections 11, 12, 13 and 14 telescopically arranged so that the sections 11 and 13 engage the sections 12 and 14 substantially as illustrated, the sections 12 and 14 being of as great an inside diameter at the flange as the outside diameter of the flange on the parts 11 and 13. This affords adjustment both horizontally and vertically to accommodate a plate 15 shown as having a plurality of apertures 16 perforating the digits allowing light to be reflected through the digits, affording visibility in the dark.

It is manifest to anyone familiar with the art that various states have license plates of various dimensions for motor vehicles, and the four sections 11, 12, 13 and 14 allow for adjustment to accommodate the plate 15. Said adjustment being limited only by the length of the governing slots 17 in the sections 12 and 14 adapted to receive the projecting member 18 permanently mounted onto the sections 11 and 13. There is a channel 19 provided in all four sections 11, 12, 13 and 14 adapted to receive the license plate 15 as shown, and an angularly disposed recess 20 adjacent the channel 19 to receive the glass 21 preferably of a ground type, to diffuse the rays of light from a lamp 23 on the bottom of a reflector 22. Immediately between the license plate 15 and the glass 21, contacting the entire edge of the glass 20, is a gasket 24 which functions as a cushion preventing rattles due to vibration when the vehicle is propelled over a rough surfaced road. The lamps 23 and 23' are permanently mounted to the rear wall 25 of sections 11 and 13, and sections 12 and 14 are provided with a vertically disposed slot 26 of substantially the same width as the base of the lamps 23 and 23' and arranged for encircling same. There is an aperture provided at points 27, 28, 29 and 30 in the license plate 15 and the channel 19 to permit engagement of screws or the like having holes 31 provided therein for the use of a wire seal shown at 32. This seal must necessarily be broken to make it possible to remove the screws holding the plate 15 in the holder 10, as the bolts in the apertures of plate 15 at points 27, 28, 29 and 30 retain the holder 10 in a fixed position of adjustment. The entire unit is supported by a mounting bracket 33 for attachment to the vehicle.

It is manifest that a device of this nature would prove operative and perform the purpose for which it is intended, in view of the fact that it may be adjusted to fit various sizes of plates. The light from the lamps being reflected against a license plate that has a plurality of apertures perforating the digits or having the entire digits cut out, when mounted adjacent a transparent or semi-transparent glass would make the digits visible in the dark, and the seals engaging the holes in the mounting screws when placed therein by the proper authorities would prevent tampering with or removal of the plate by anyone without authority.

Although I have shown and described a particular construction of my device, it is to be understood that I can make such changes as I may deem necessary, without departing from the spirit of my invention as set forth in the appended claim.

What I claim and desire to secure by Letters Patent in the United States, is:

In a license plate holder, a hollow casing formed of vertical and longitudinal movable quarter sections slidably engaging one another, and provided with a side opening to receive a license plate having perforated digits, the adjacent wall portions of said sections being overlapped, electric light sockets carried at the inner sides of certain of said sections opposite the said opening, the edges of adjacent walls of the other sections being slotted for engagement about said sockets to allow for a relative adjustment of the sections to vary the area of the said opening to fit above a license plate of a given size, a reflector supported from each of the said sockets for directing light from lamps in the sockets to and through the perforations in said license plate, and apertures in the side openings to register with aperture in a license plate and to retain the sections in position.

ALBERT A. MARKS.